(12) United States Patent
Gorrilla

(10) Patent No.: US 10,451,110 B2
(45) Date of Patent: Oct. 22, 2019

(54) HYDROSTATIC BEARING ASSEMBLY FOR AN X-RAY TUBE

(71) Applicant: General Electric Company, Schenectady, NY (US)

(72) Inventor: Michael William Gorrilla, West Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 142 days.

(21) Appl. No.: 15/827,841

(22) Filed: Nov. 30, 2017

(65) Prior Publication Data

US 2019/0162231 A1    May 30, 2019

(51) Int. Cl.
*F16C 33/72* (2006.01)
*H01J 35/16* (2006.01)
*F16C 32/06* (2006.01)

(52) U.S. Cl.
CPC ........ *F16C 32/064* (2013.01); *F16C 32/0637* (2013.01); *F16C 32/0659* (2013.01); *F16C 2210/08* (2013.01)

(58) Field of Classification Search
CPC .. F16C 33/72; F16C 32/0637; F16C 32/0659; F16C 2380/16; F16C 32/06; H01J 35/16
See application file for complete search history.

(56) References Cited

U.S. PATENT DOCUMENTS

2018/0223908 A1 * 8/2018 Hunt .................. H01J 35/16

* cited by examiner

*Primary Examiner* — Don K Wong
(74) *Attorney, Agent, or Firm* — Boyle Fredrickson, S.C.

(57) ABSTRACT

A hydrostatic bearing assembly or structure for an x-ray tube and associated process for manufacturing and operating the bearing assembly is provided to reduce and potentially eliminate wear from landing or takeoff of the rotating component of the bearing assembly on the non-rotating component. The shaft and sleeve are separated by a gap in which an amount of a liquid metal is placed in order to provide the sleeve with the ability to rotate about the shaft, or vice versa. The non-rotating component of the hydrostatic bearing assembly is formed with a number of fluid channels extending through the component and in communication with the gap. The liquid metal is pumped into and out of the gap via the channels under pressure supplied by a magnetohydrodynamic pump to maintain the separation of the rotating and non-rotating components of the bearing assembly.

20 Claims, 5 Drawing Sheets

HYDROSTATIC BEARING ASSEMBLY FOR AN X-RAY TUBE

BACKGROUND OF THE DISCLOSURE

The invention relates generally to x-ray tubes, and more particularly to structures and methods of assembly and operation for a hydrostatic bearing utilized in an x-ray tube.

X-ray systems may include an x-ray tube, a detector, and a support structure for the x-ray tube and the detector. In operation, an imaging table, on which an object is positioned, may be located between the x-ray tube and the detector. The x-ray tube typically emits radiation, such as x-rays, toward the object. The radiation passes through the object on the imaging table and impinges on the detector. As radiation passes through the object, internal structures of the object cause spatial variances in the radiation received at the detector. The detector then emits data received, and the system translates the radiation variances into an image, which may be used to evaluate the internal structure of the object. The object may include, but is not limited to, a patient in a medical imaging procedure and an inanimate object as in, for instance, a package in an x-ray scanner or computed tomography (CT) package scanner.

X-ray tubes include a cathode and an anode located within a high-vacuum environment. In many configurations, the anode structure is supported by a hydrodynamic or liquid metal bearing structure, e.g., a spiral groove bearing (SGB) structure, formed with a support shaft disposed within a sleeve or shell to which the anode is attached and that rotates around the support shaft. The spiral groove bearing structure also includes spiral or helical grooves on various surfaces of the sleeve or shell that serve to take up the radial and axial forces acting on the sleeve as it rotates around the support shaft.

Typically, an induction motor is employed to rotate the anode, the induction motor having a cylindrical rotor built into an axle formed at least partially of the sleeve that supports the anode target and an iron stator structure with copper windings that surrounds an elongated neck of the x-ray tube. The rotor of the rotating anode assembly is driven by the stator. The x-ray tube cathode provides a focused electron beam that is accelerated across an anode-to-cathode vacuum gap and produces x-rays upon impact with the anode. Because of the high temperatures generated when the electron beam strikes the target, it is often necessary to rotate the anode assembly at high rotational speed. This places stringent demands on the bearings and the material forming the anode structure, i.e., the anode target and the shaft supporting the target.

Advantages of hydrodynamic or liquid metal bearings such as spiral groove bearings in x-ray tubes include a high load capability and a high heat transfer capability due to an increased amount of contact area. Other advantages include low acoustic noise operation as is commonly understood in the art. Gallium, indium, or tin alloys are typically used as the liquid metal in the hydrodynamic bearing structure, as they tend to be liquid at room temperature and have adequately low vapor pressure, at operating temperatures, to meet the rigorous high vacuum requirements of an x-ray tube.

However, hydrodynamic bearings with liquid metal working fluids typically contain one or more journal bearings and one or more thrust bearings. A common issue with these types of bearings is they have zero load capacity when not rotating or when the speed of rotation is low enough for the liquid metal to be unable to support the rotating component of the bearing assembly. As such, when the hydrodynamic bearing slows below a certain minimum rotational speed at which the liquid metal can support the rotating component, e.g., the sleeve, the sleeve tends to land on/contact the non-rotating component at some non-zero rotational speed. This surface to surface relative motion between the rotating and non-rotating bearing components causes wear and reduces life and performance of the bearing assembly. Landing of hydrodynamic bearings is a major source of wear in the hydrodynamic bearing assembly and is a significant failure mode for x-ray tubes. A similar source of bearing wear occurs during bearing takeoff (starting sleeve rotation from a stationary state) as the sleeve, for a period of time, does not have sufficient relative velocity to the shaft to produce bearing fluid support.

Therefore, it is desirable to develop a structure and method for the operation of a bearing assembly or structure for an x-ray tube that reduces the stresses on the rotating component of the bearing assembly to significantly decrease wear resulting from the landing or takeoff of the rotating bearing component on the non-rotating component, resulting in increased useful life for the bearing assembly.

BRIEF DESCRIPTION OF THE DISCLOSURE

In the present disclosure a hydrostatic bearing assembly or structure for an x-ray tube and associated process for manufacturing and operating the bearing assembly is provided to reduce and potentially eliminate wear from landing or takeoff of the rotating component of the bearing assembly on the non-rotating component. The hydrostatic bearing assembly can be formed with any suitable structure, such as a cantilevered bearing, or a straddle bearing assembly provided that it includes a bearing shaft disposed within a bearing sleeve that rotates around the bearing shaft, or vice versa. The shaft includes a pair of journal bearings extending outwardly from opposite sides of a thrust flange that extends radially outwardly from the shaft. The sleeve is formed complementary to the shaft to enclose the journal bearings and the thrust flange and to retain the liquid metal bearing fluid between the shaft and sleeve in the hydrostatic bearing assembly.

The shaft and sleeve are separated by a gap in which an amount of a liquid metal is placed in order to provide the sleeve with the ability to rotate about the shaft, or vice versa. The shaft or non-rotating component of the hydrostatic bearing assembly is formed with a number of fluid channels extending through the shaft and in communication with the gap. The liquid metal is pumped into and out of the gap via the channels under pressure supplied by a magnetohydrodynamic pump in one exemplary embodiment. The use of a magnetohydrodynamic pump with no moving parts is suited to handle the harsh operating conditions of the metal fluid and of the x-ray tube.

The flow of the pressurized liquid metal from the pump provides a sufficient pressure on the liquid metal positioned within the gap to adequately support and/or space the sleeve from the shaft at any speed of rotation, including non-rotation, of the sleeve/rotating component relative to the shaft/non-rotating component. In this manner the pressurized fluid present in the hydrostatic bearing assembly prevents contact of the bearing sleeve and shaft with one another, consequently preventing wear resulting from such contact and significantly increasing the operational or useful life of the bearing assembly.

In one exemplary embodiment of the invention, a bearing assembly for an x-ray tube includes a shaft including a thrust flange and a number of supply lines and a number of return lines formed within the shaft, a sleeve rotatably disposed around the shaft and including a radial cavity disposed around the thrust flange, the sleeve defining a gap between the sleeve and the shaft and a pump connected to the number of supply lines and to the number of return lines, wherein the pump supplies pressurized fluid through the shaft to the gap to prevent contact of the sleeve with the shaft.

In another exemplary embodiment of the invention, an x-ray tube is provided including a cathode assembly and an anode assembly spaced from the cathode assembly, wherein the anode assembly has a shaft rotatably including a thrust flange and a number of supply lines and a number of return lines formed within the shaft, a sleeve rotatably disposed around the shaft and including a radial cavity disposed around the thrust flange, the sleeve defining a gap between the sleeve and the shaft, a lubricant disposed in the gap between the shaft and the sleeve, a pump connected to the number of supply lines and to the number of return lines, wherein the pump pressurizes and directs the lubricant through the shaft to the gap to prevent contact of the sleeve with the shaft and an anode target operably connected to the sleeve.

In an exemplary embodiment of the method of the invention, a method for reducing wear on a bearing assembly within an x-ray tube including the steps of providing an x-ray tube having a cathode assembly and an anode assembly spaced from the cathode assembly, wherein the anode assembly includes a shaft rotatably including a thrust flange and a number of supply lines and a number of return lines formed within the shaft, a sleeve rotatably disposed around the shaft and including a radial cavity disposed around the thrust flange, the sleeve defining a gap between the sleeve and the shaft, a lubricant disposed in the gap between the shaft and the sleeve, a pump connected to the number of supply lines and to the number of return lines, wherein the pump pressurizes and direct the lubricant through the shaft to the gap to prevent contact of the sleeve with the shaft and an anode target operably connected to the sleeve, and operating the pump to pressurize and direct the lubricant along the number of supply lines into the gap between the shaft and the sleeve.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DISCLOSURE

Figure 1:
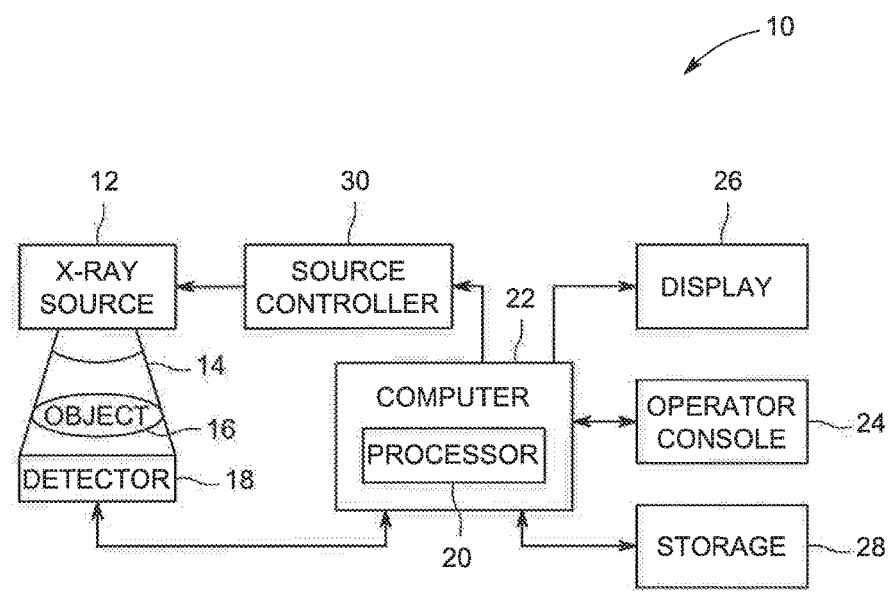
FIG. 1 is a block diagram of an imaging system incorporating exemplary embodiments of the invention.

FIG. 1 is a block diagram of an embodiment of an imaging system 10 designed both to acquire original image data and to process the image data for display and/or analysis in accordance with embodiments of the invention. It will be appreciated by those skilled in the art that various embodiments of the invention are applicable to numerous medical imaging systems implementing an x-ray tube, such as x-ray or mammography systems. Other imaging systems such as computed tomography (CT) systems and digital radiography (RAD) systems, which acquire image three dimensional data for a volume, also benefit from the invention. The following discussion of x-ray system 10 is merely an example of one such implementation and is not intended to be limiting in terms of modality.

As shown in FIG. 1, imaging system 10 includes an x-ray tube or source 12 configured to project a beam of x-rays 14 through an object 16. Object 16 may include a human subject, pieces of baggage, or other objects desired to be scanned. X-ray source 12 may be conventional x-ray tubes producing x-rays 14 having a spectrum of energies that range, typically, from thirty (30) keV to two hundred (200) keV. The x-rays 14 pass through object 16 and, after being attenuated, impinge upon a detector assembly 18. Each detector module in detector assembly 18 produces an analog electrical signal that represents the intensity of an impinging x-ray beam, and hence the attenuated beam, as it passes through the object 16. In one embodiment, detector assembly 18 is a scintillation based detector assembly, however, it is also envisioned that direct-conversion type detectors (e.g., CZT detectors, etc.) may also be implemented.

A processor 20 receives the signals from the detector 18 and generates an image corresponding to the object 16 being scanned. A computer 22 communicates with processor 20 to enable an operator, using operator console 24, to control the scanning parameters and to view the generated image. That is, operator console 24 includes some form of operator interface, such as a keyboard, mouse, voice activated controller, or any other suitable input apparatus that allows an operator to control the x-ray system 10 and view the reconstructed image or other data from computer 22 on a display unit 26. Additionally, console 24 allows an operator to store the generated image in a storage device 28 which may include hard drives, floppy discs, compact discs, etc. The operator may also use console 24 to provide commands and instructions to computer 22 for controlling a source controller 30 that provides power and timing signals to x-ray source 12.

Figure 2:
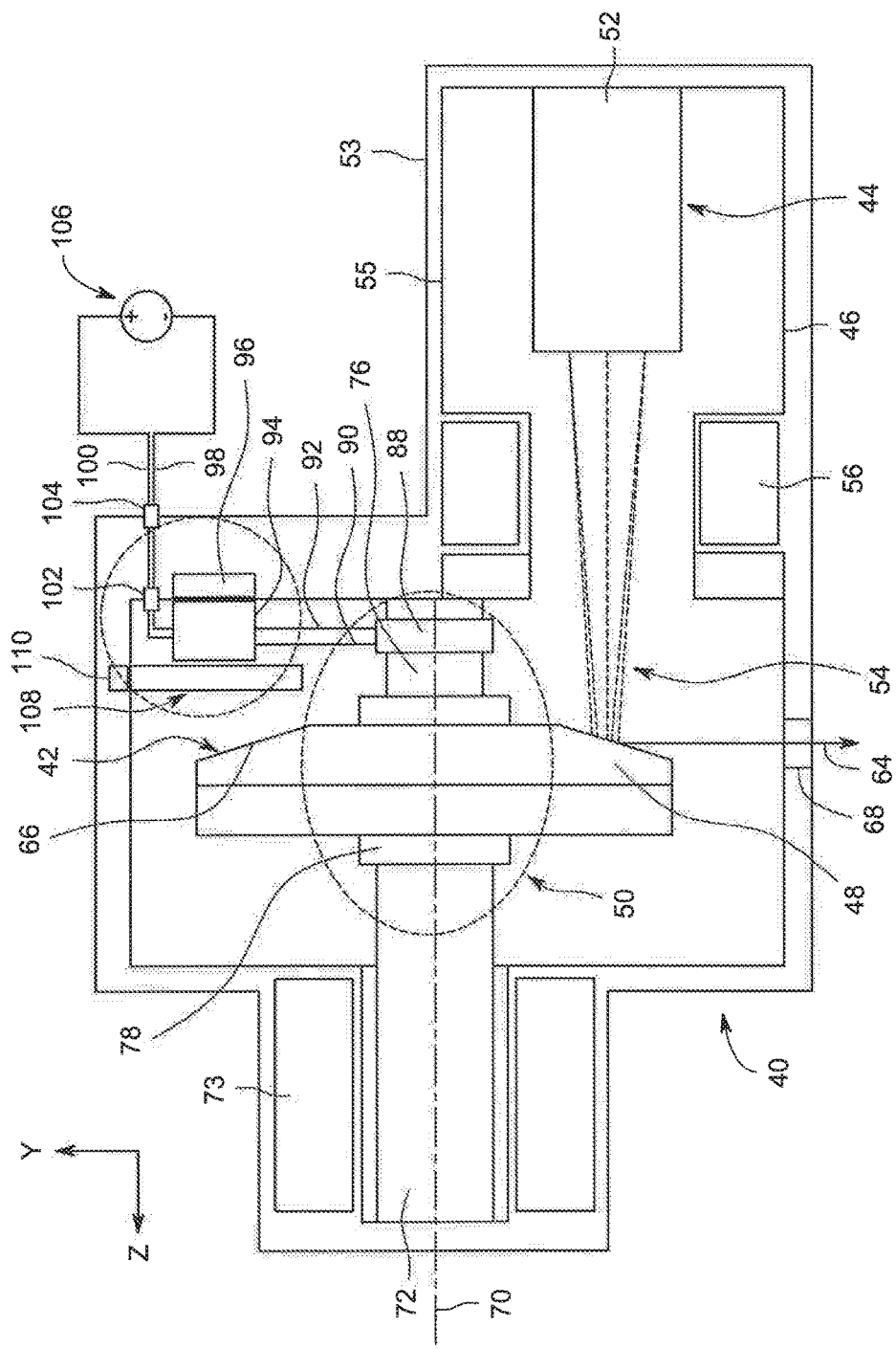
FIG. 2 is a cross-sectional view of a portion of an x-ray tube according to an exemplary embodiment of the invention and usable with the system illustrated in FIG. 1.

FIG. 2 illustrates a cross-sectional view of an x-ray source 12 incorporating embodiments of the invention. In the illustrated embodiment, x-ray source 12 is formed of an x-ray tube 40 that includes an anode assembly 42 and a cathode assembly 44. X-ray tube 40 is supported by the anode and cathode assemblies 42, 44 within a frame 46, which houses a target or anode 48, a bearing assembly 50, and a cathode 52. Frame 46 defines an area of relatively low pressure (e.g., a vacuum) compared to ambient, in which high voltages may be present. Frame 46 may be positioned within a casing 53 filled with a cooling medium 55, such as oil, that may also provide high voltage insulation. While the target and anode are described above as being a common component of x-ray tube 40, the target and anode may be separate components in alternative x-ray tube embodiments.

In operation, an electron beam 54 is produced by cathode assembly 44. In particular, cathode 52 receives one or more electrical signals via a series of electrical leads (not shown). The electrical signals may be timing/control signals that cause cathode 52 to emit the electron beam 54 at one or more energies and at one or more frequencies. The electrical signals may also at least partially control the potential between cathode 52 and anode 48. Optics 56 are spaced from the cathode 52 and operate as an electrostatic and or electromagnetic lens that focuses electrons emitted from the cathode 52 to direct the electron beam 54 onto a focal surface 66 on the target 48.

X-rays 64 are produced when high-speed electrons of electron beam 54 are suddenly decelerated when directed from the cathode 52 to a target or focal surface 66 formed on target 48 via a potential difference therebetween of, for example, sixty (60) thousand volts or more in the case of CT applications. The x-rays 64 are emitted through a radiation emission passage 68 formed in frame 46 and casing 53 toward a detector array, such as detector 18 of FIG. 1.

Anode assembly 42 includes a rotor 72 and a stator 73 partially surrounding rotor 72 for causing rotation of anode 48 during operation. Target 48 is supported in rotation by a bearing assembly 50, which, when rotated, also causes target 48 to rotate about the centerline 70.

Target 48 may be manufactured to include a number of metals or composites, such as tungsten, molybdenum, or any material that contributes to Bremsstrahlung (i.e., deceleration radiation) when bombarded with electrons. Target or focal surface 66 of target 48 may be selected to have a relatively high refractory value so as to withstand the heat generated by electrons impacting target 48. Further, the space between cathode assembly 44 and target 48 may be evacuated in order to minimize electron collisions with other atoms and to maximize an electric potential.

To avoid overheating of the target 48 when bombarded by the electrons, rotor 72 rotates target 48 at a high rate of speed (e.g., 90 to 250 Hz) about a centerline 70. In addition to the rotation of target 48 within x-ray tube volume 46, in a CT application, the x-ray source 40 as a whole is caused to rotate about an object, such as object 16 of imaging system 10 in FIG. 1, at rates of typically 1 Hz or faster.

Bearing assembly 50 can be formed as necessary, such with a number of suitable ball bearings (not shown), but in the illustrated exemplary embodiment comprises a fluid supported bearing having adequate load-bearing capability and acceptable acoustic noise levels for operation within imaging system 10 of FIG. 1.

In general, bearing assembly 50 includes a stationary portion, such as center shaft 76, and a rotating portion, such as sleeve 78 to which the target 48 is attached. While center shaft 76 is described with respect to FIG. 2 as the stationary portion of bearing assembly 50 and sleeve 78 is described as the rotating portion of bearing assembly 50, embodiments of the present invention are also applicable to embodiments wherein center shaft 76 is a rotary shaft and sleeve 78 is a stationary component. In such a configuration, target 48 would rotate as center shaft 76 rotates.

Figure 3:
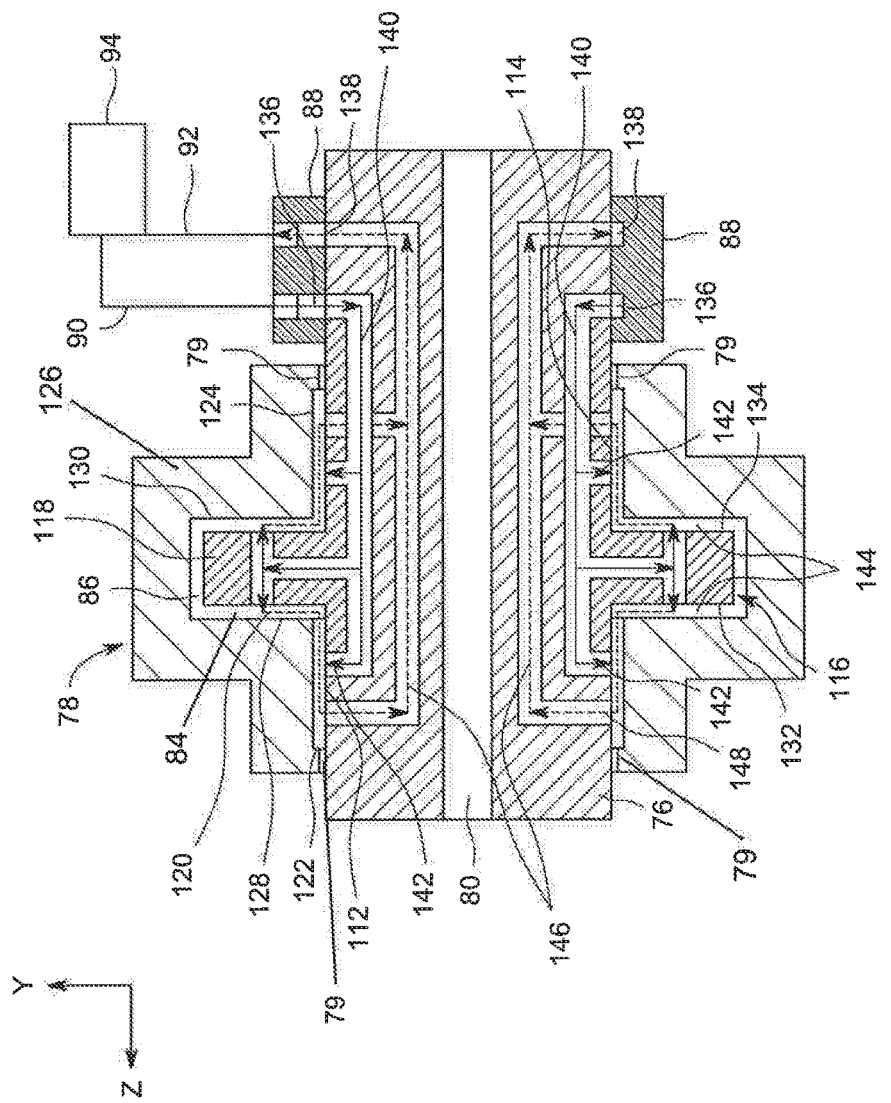
FIG. 3 is a cross-sectional view of a bearing structure of an x-ray tube in FIG. 2 in accordance with an exemplary embodiment of the invention.

Referring now to FIGS. 2 and 3, a cross-sectional view of a portion of bearing assembly or structure 50 is shown according to an embodiment of the invention. Bearing assembly 50 includes a center shaft 76 positioned within sleeve 78, which is configured to support an anode (not shown), such as target 48 of FIG. 2. A lubricant 84 is positioned in a gap 86 formed between center shaft 76 and sleeve 78. In embodiments of the invention, lubricant 84 is a metal or metallic alloy that exists in a liquid state at operating temperature of bearing assembly 50.

The lubricating fluid 84 flowing between the rotating and stationary components of the bearing assembly or structure 50 may include a variety of individual fluids as well as mixtures of fluids. For example, multiple liquid metals and liquid metal alloys may be used as the lubricating fluid, such as an indium gallium alloy. More generally, fluids with relatively low vapor pressures that are resistant to evaporation in vacuum-level pressures of the x-ray tube may be used. In the present context, low vapor pressures may generally be in the range of $1 \times 10^{-5}$ Torr. In other words, fluids that are stable in vacuums are desirable for use in x-ray tube systems so as to not adversely affect the established vacuum during operation of the system. In the present disclosure, lubricant 84 may be gallium or a gallium alloy as non-limiting examples.

In the embodiment illustrated in FIG. 3, center shaft 76 of bearing assembly 50 is a stationary component and shell 78 is a rotatable component constructed to rotate about center shaft 76. However, one skilled in the art will recognize the inventive concepts described herein are applicable to alternative bearing configurations. As one example, bearing assembly 50 may instead include a stationary outer component and a rotating center shaft comprising a target attached thereto. As another example, and as illustrated in the exemplary embodiment of FIGS. 2 and 3, bearing assembly 50 may be a "straddle" bearing that is configured to support a target between a first and a second liquid metal bearing. In other words, embodiments of this invention may be incorporated into any bearing configuration utilizing a liquid lubricated bearing to support an anode or target. Such configurations may include a stationary center shaft and a rotatable outer shaft, and vice versa. Further, one skilled in the art will recognize that such applications need not be limited to x-ray tubes, but may be applied to any configuration having a rotating component in a vacuum, the rotating component being supported by a liquid lubricated bearing. Thus, the embodiments of the invention disclosed herein are applicable to any bearing configuration having a rotatable component and a stationary component, and a liquid lubricant therebetween, regardless of configuration or application. Further, to retain the liquid lubricant 84 between the shaft 76 and the sleeve 78 as they rotate relative to one another, rotating seals 79 are disposed between the shaft 76 and each end the sleeve 78. The seals 79 can be formed in any conventional manner using the tight tolerances and/or any flow restricting structures (not shown) present between the shaft 76 and the sleeve 78 at these locations to prevent capillary flow between the shaft 76 and the sleeve 78, and/or can utilize various anti-wetting coatings (not shown) applied to the shaft 76 and/or sleeve 78 at these locations.

As illustrated in FIG. 2, center shaft 76 of bearing assembly 50 includes a manifold 88 disposed around the shaft 76. The manifold 88 is connected to a supply line 90 and a return line 92, each of which are operably connected to a magnetohydrodynamic pump 94. The pump 94 is located within the frame 46 and includes a heat exchanger 96 operably connected to the pump 94. The heat exchanger 96 is disposed between the frame 46 and the casing 53, such that the heat exchanger 96 is in fluid contact with the cooling medium 55 disposed between the frame 46 and the casing 53. The contact between the heat exchanger 96 and the cooling fluid/medium 55 operates to provide cooling to the pump 94 and to the lubricant 84 passing through the pump 94.

To limit radiative heating of the pump 94, the pump 94 is positioned within the frame 46 behind and/or adjacent a radiation heat shield 108. To dissipate heat transferred to shield 108 from the target, the shield 108 may conduct heat to and across the frame 46 to a heat exchanger 110 disposed outside of the frame 46 in fluid contact with the cooling medium 55 located between the frame 46 and the casing 53.

The pump 94 also includes an input power lead 98 and an output power lead 100 connected to the pump 94 and extending through a casing feedthrough 104 and a frame feedthrough 102 into connection with a power supply 106.

Referring now to the exemplary embodiment illustrated in FIG. 3, center shaft 76 of bearing assembly 50 includes a pair of journal bearings 112,114 extending outwardly from opposite sides of a radial projection 116 comprising a thrust flange 118 that extends radially outwardly from center shaft 76 and is positioned in a radial cavity 120 of sleeve 78. In the exemplary embodiment where the shaft 76 forms the stationary or non-rotating component of the straddle bearing assembly 50, the ends of each journal bearing 112,114 opposite the thrust flange 118 can be affixed to the frame 46. The sleeve 78 is formed complementary to the shaft 76 and includes a pair of collars 122,124 disposed around the journal bearings 112,114 and extending outwardly from opposed sides of a central portion 126 of the sleeve 78 within which is defined the radial cavity 120.

The radial cavity 120 includes a pair of radial surfaces 128,130 spaced from thrust bearings/surfaces 132,134 on opposed sides of the thrust flange 118 by the lubricant 84 disposed within the gap 86 between radial projection 116 and radial cavity 120. Radial projection 116 limits axial motion of sleeve 78 relative to center shaft 76, and, as illustrated, need not be limited in axial length, but may be extended in axial length to provide additional mechanical support of components.

The manifold 88 is positioned on the shaft 76 in alignment with a number of inlet/supply ports 136 and a number of outlet/return ports 138 formed in and radially disposed about the shaft 76. Each supply port 136 connects to an associated supply line 140 extending through the interior of the shaft 76. The supply lines 140 each terminate at a number of journal bearing supply ports/outlets 142 and thrust bearing ports/outlets 144 formed in and radially disposed about the journal bearings 112,114 and the thrust flange 118, respectively. In the exemplary embodiment of FIG. 3, the supply lines 140 each include a journal bearing supply port 142 in each journal bearing 112 and 114, and a thrust bearing port 144 in each thrust bearings/surface 132 and 134 on opposed sides of the thrust flange 118 where the various ports 142 and 144 are radially disposed about the journal bearings 112,114 and the thrust flange 118 to provide even and balanced fluid support.

Each return port/outlet 138 within the manifold 88 connects to an associated return line 146 extending through the interior of the shaft 76. The return lines 146 each terminate at a number of journal bearing return ports/inlets 148 formed in the journal bearings 112,114. In the exemplary embodiment of FIG. 3, the return lines 146 each include a journal bearing return port 148 in each journal bearing 112 and 114 that are spaced from the journal bearing supply ports 142. In the illustrated exemplary embodiment, the journal bearing return ports 148 are located near the rotational seals 79 in order to effectively reduce the pressure of the lubricant 84 adjacent the seals 79, thereby assisting in the operation of the seals 79.

In operation, the lubricant 84 is introduced into the shaft 76 under pressure via the manifold 88. The lubricant 84 enters the supply lines 140 and is directed to the journal bearing supply ports 142 and thrust bearing supply ports 144. The lubricant 84 exits the ports 142,144 and enters the gap 86 under pressure to function to separate the sleeve 78 from the shaft 76. The lubricant 84 moves along the gap 86 to provide the support function for the sleeve 78 around the shaft 76 until reaching a journal bearing return port 148 and entering the associated return line 146. The pressure provided by the pump 94 to the lubricant 84 continually entering and exiting the gap 86 provides continuous support for the sleeve 78 around the shaft 76 during operation of the hydrostatic bearing assembly 50 including the pump 94. At a minimum the pump 94 can be operated to provide the pressure necessary for the lubricant 84 to maintain the gap 86 between the shaft 76 and a stationary sleeve 78, such that the sleeve 78 does not contact the shaft 76 whether the sleeve 78 is rotating or not, resulting in significant wear reduction on the shaft 76 and the sleeve 78. In an exemplary embodiment, the pump 94 can pressurize the lubricant 84 to a range between about 10 psi to about 300 psi in order to provide the necessary force to the lubricant 84 to maintain the desired separation or gap 86 between the components of the bearing assembly 50.

The pressurized lubricant 84 from the pump 94 can provide this support to the sleeve 78 at any rotational speed of the sleeve 78 with respect to the shaft 76, as the lubricant 84 provides the pressure from the pump 94 without any required motion between parts of the bearing assembly 50, such that the bearing assembly 50 is a hydrostatic bearing assembly. As such the lubricant 84 can be supplied to the bearing assembly 50 to support the sleeve 78 around the shaft 76 even when the sleeve 78 is not rotating relative to the shaft 76.

Further, the amount of pressure required to be supplied to the lubricant 84 by the pump 94 can be approximately the same as the pressure supplied by the lubricant 84 in a hydrodynamic bearing in order to support the sleeve 78 around the shaft 76, such that the power requirements for the pump 94 are not overly large. Also, as the lubricant 84 in the hydrostatic bearing assembly 50 can be operated continuously to effectively prevent contact between the shaft 76 and the sleeve 78, the useful life of the bearing assembly 50 can be shifted to be dependent upon the useful life of one of the rotational seals 79 or the pump 94, significantly increasing the useful life of the tube 12 including the assembly 50.

Figure 4:
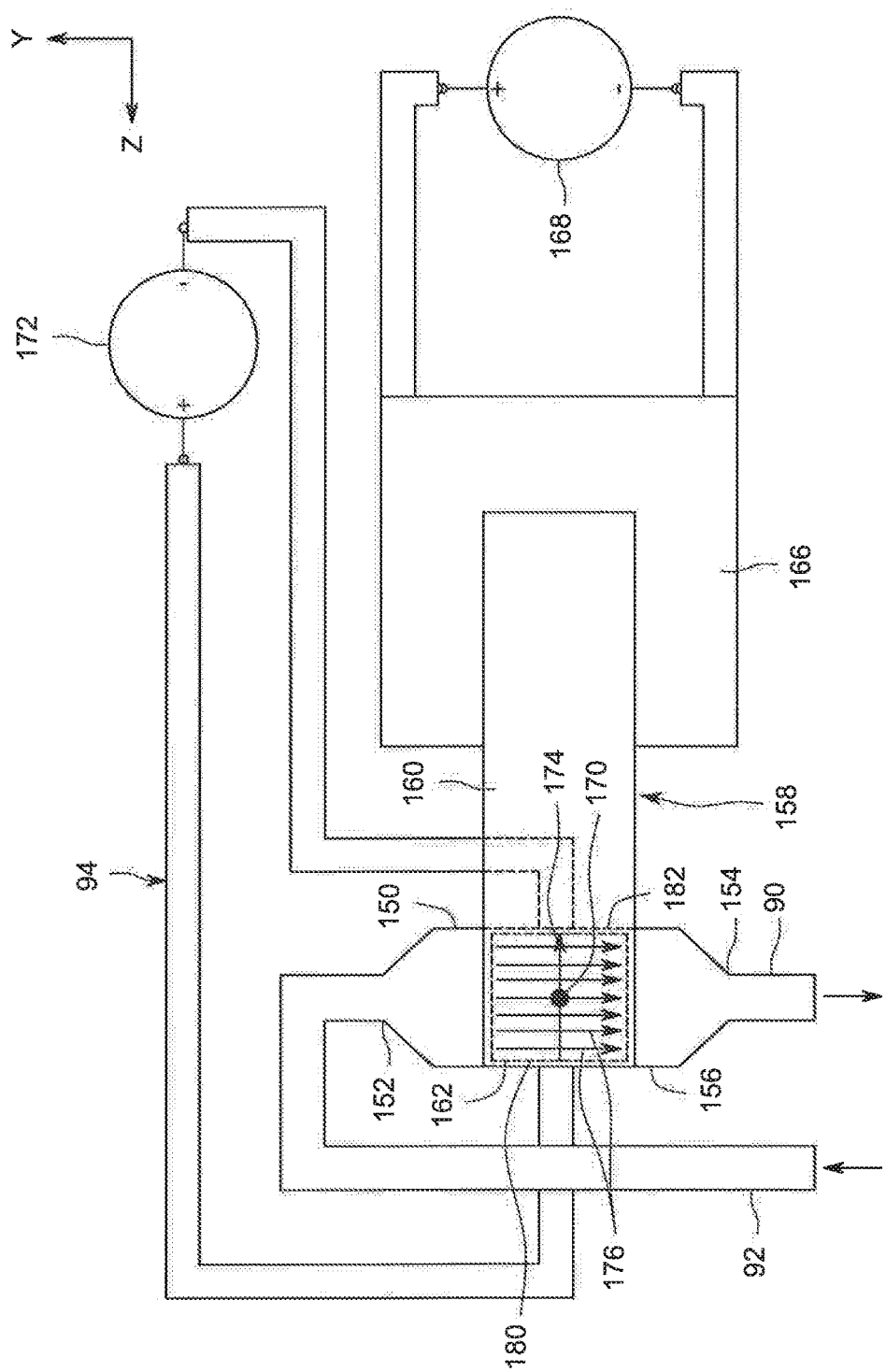
FIG. 4 is a top plan cross-sectional view of a hydrodynamic pump in FIG. 2 in accordance with one exemplary embodiment of the invention.
Figure 5:
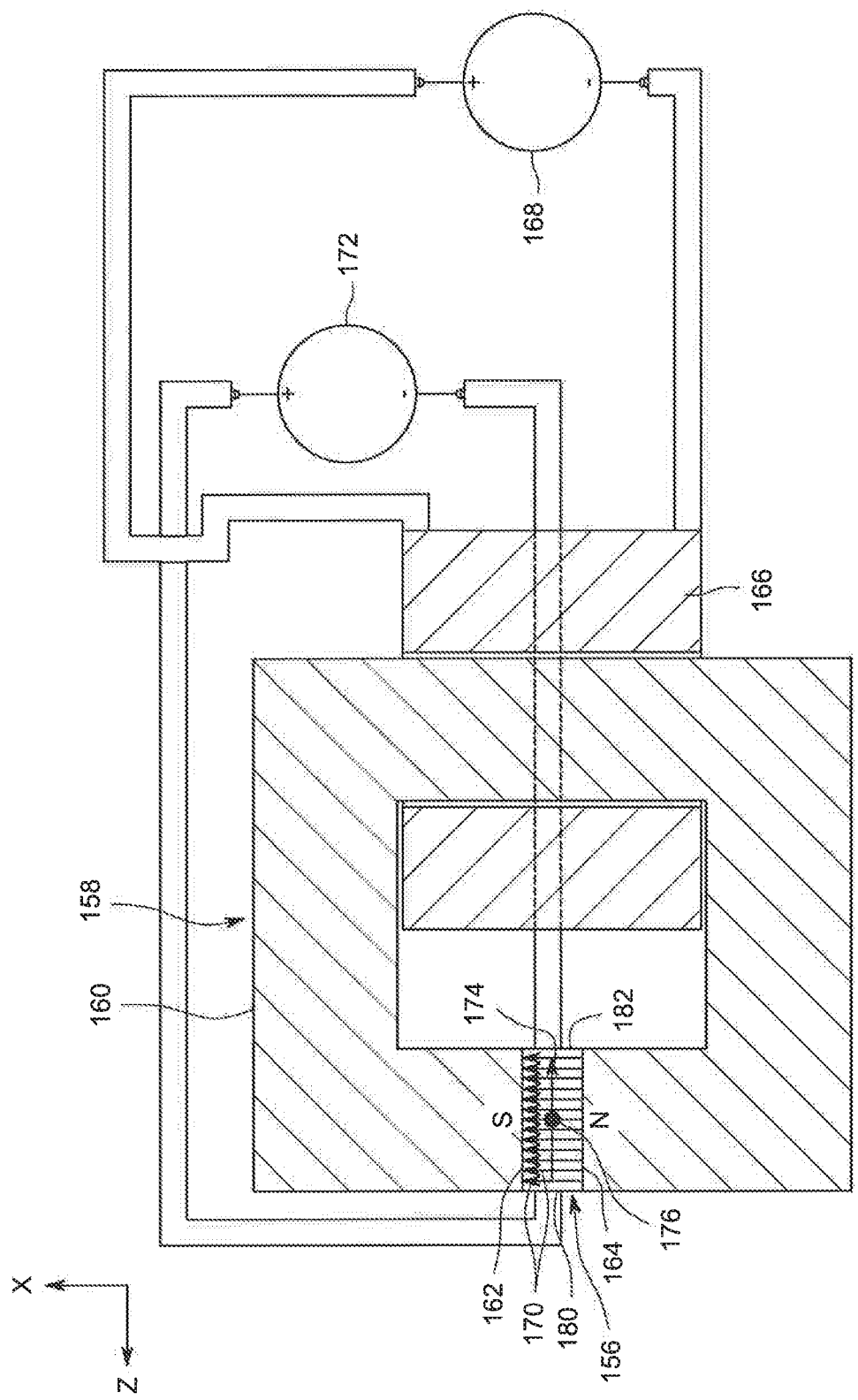
FIG. 5 is a front plan cross-sectional view of the hydrodynamic pump of FIG. 2.

Looking now at the illustrated exemplary embodiment of FIGS. 4 and 5, the pump 94 is formed as magnetohydrodynamic pump. The pump 94 includes a housing 150 with an inlet 152 connected to the return line 92 and an outlet 154 connected to the supply line 90. Between the inlet 152 and outlet 154 the housing 150 forms a working fluid/lubricant duct 156 that passes through an electromagnetic core stack 158. The stack 158 includes one or more electromagnets 160 that terminate in high magnetic permeability, electrically insulating walls 162,164 disposed adjacent opposite sides of the duct 156. Opposite the walls 162,164 the electromagnet(s) 160 pass through a winding bobbin 166 that is connected to a DC power supply 168. When power is provided by the supply 168 to the bobbin 166, the electromagnet(s) 160 create an electromagnetic field 170 along the X axis from the north pole/wall 164 to the south pole/wall 162 through the duct 156.

Concurrently, a working fluid/lubricant DC power supply 172 is connected to electrodes 180,182 located on opposite sides of the duct 156 and oriented perpendicular to the insulating walls 162,164 in the duct 156. The power supply 172 is operated to direct a current 174 between the electrodes 180,182 through the duct 156 and the electrically conductive lubricant 84 passing through the duct 156 in a direction perpendicular to the direction of the electromagnetic field 170, i.e., along the Z axis. The combination of the current 174 directed through the lubricant 84 and the electromagnetic field 170 through which the charged lubricant 84 passes creates a Lorentz force 176 acting on the lubricant 84 along the Y axis, which provides the motive force acting on the lubricant 84 to create the pressurized flow of lubricant 84 through the shaft 76. The force applied to the lubricant 84 and thus the pressure of the lubricant 84 passing through the shaft 76 can be adjusted by varying the current 174 directed through the lubricant 84 and/or the electromagnetic field 170 through which the charged lubricant 84 passes.

With the hydrostatic bearing assembly 50 described herein, the assembly 50 can eliminate wear caused by landing or takeoff of bearing components on one another, and can decouple bearing speed from load capability, which can allow for higher gantry speeds for the same target bearing speed than hydrodynamic bearings and can have a higher load capability than conventional hydrodynamic bearings.

In alternative exemplary embodiments, the pump 94 can be located externally of the frame 46, if desired. Additionally, the pump 94 for the bearing assembly 50 can be operated continuously to constantly maintain the gap 86 between the shaft 76 and the sleeve 78, or the pump 94 can be operated within time periods from just prior to initiation of rotation of the sleeve 78 relative to the shaft 76 (i.e., to lift the stationary sleeve 78 off of the shaft 76 prior to rotation) to just after the sleeve 78 ceases rotating relative to the shaft 76 (i.e., to lower the stationary sleeve 78 onto the shaft 76).

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing assembly for an x-ray tube, the bearing assembly comprising:
   a shaft including a thrust flange and a number of supply lines and a number of return lines formed within the shaft;
   a sleeve rotatably disposed around the shaft and including a radial cavity disposed around the thrust flange, the sleeve defining a gap between the sleeve and the shaft; and
   a pump connected to the number of supply lines and to the number of return lines, wherein the pump supplies pressurized fluid through the shaft to the gap to prevent contact of the sleeve with the shaft.

2. The bearing assembly of claim 1, wherein the pressurized fluid is an electrically conductive fluid.

3. The bearing assembly of claim 2, wherein the electrically conductive fluid is a liquid metal.

4. The bearing assembly of claim 1, wherein the pump employs a Lorentz force to pressurize the fluid.

5. The bearing assembly of claim 4, wherein the pump is a magnetohydrodynamic pump.

6. The bearing assembly of claim 1, further comprising a manifold disposed around the shaft and operably connected between the number of supply lines and the number of return lines within the shaft and the pump.

7. The bearing assembly of claim 6, wherein the number of supply lines each comprise:
   a supply inlet adjacent the manifold; and
   at least one supply outlet adjacent the gap.

8. The bearing assembly of claim 7, wherein the at least one supply outlet comprises:
   a journal bearing supply port; and
   a thrust bearing supply port.

9. The bearing assembly of claim 6, wherein the number of return lines each comprise:
   a return outlet adjacent the manifold; and
   at least one return inlet adjacent the gap.

10. The bearing assembly of claim 9, wherein the at least one return inlet comprises a journal bearing return port.

11. An x-ray tube comprising:
    a cathode assembly; and
    an anode assembly spaced from the cathode assembly, wherein the anode assembly comprises:
      a shaft rotatably including a thrust flange and a number of supply lines and a number of return lines formed within the shaft;
      a sleeve rotatably disposed around the shaft and including a radial cavity disposed around the thrust flange, the sleeve defining a gap between the sleeve and the shaft;
      a lubricant disposed in the gap between the shaft and the sleeve;
      a pump connected to the number of supply lines and to the number of return lines, wherein the pump pressurizes and directs the lubricant through the shaft to the gap to prevent contact of the sleeve with the shaft; and
      an anode target operably connected to the sleeve.

12. The x-ray tube of claim 11, wherein the pump is a magnetohydrodynamic pump.

13. The x-ray tube of claim 11, wherein the pump is disposed within a frame for the x-ray tube.

14. The x-ray tube of claim 13, wherein the pump includes a heat exchanger positioned in contact with a cooling medium disposed around the exterior of the frame.

15. The x-ray tube of claim 13, further comprising a heat shield disposed between the pump and the anode target.

16. The x-ray tube of claim 11, wherein the lubricant is an electrically conductive lubricant.

17. A method for reducing wear on a bearing assembly within an x-ray tube, the method comprising the steps of:
    providing an x-ray tube comprising:
      a cathode assembly; and
      an anode assembly spaced from the cathode assembly, wherein the anode assembly comprises:
        a shaft rotatably including a thrust flange and a number of supply lines and a number of return lines formed within the shaft;
        a sleeve rotatably disposed around the shaft and including a radial cavity disposed around the thrust flange, the sleeve defining a gap between the sleeve and the shaft;
        a lubricant disposed in the gap between the shaft and the sleeve;
        a pump connected to the number of supply lines and to the number of return lines, wherein the pump pressurizes and directs the lubricant through the shaft to the gap to prevent contact of the sleeve with the shaft; and an anode target operably connected to the sleeve; and operating the pump to pressurize and direct the lubricant along the number of supply lines into the gap between the shaft and the sleeve.

18. The method of claim 17, wherein the pump is a magnetohydrodynamic pump and the step of operating the pump comprises:

passing a current through the lubricant passing through the pump; and directing the lubricant through an electromagnetic field to create a Lorentz force acting on the lubricant passing through the pump.

19. The method of claim 17, wherein the step of operating the pump comprises continuously operating the pump while the sleeve is rotating with respect to the shaft.

20. The method of claim 17, wherein the step of operating the pump comprises continuously operating the pump while the sleeve is not rotating with respect to the shaft.

* * * * *